Nov. 26, 1935.   A. R. UPP   2,022,062

SCALE FOR PACKING FRUITS

Filed Jan. 15, 1934

INVENTOR
A. R. Upp

BY
ATTORNEY

Patented Nov. 26, 1935

2,022,062

UNITED STATES PATENT OFFICE 2,022,062

SCALE FOR PACKING FRUITS

Ada R. Upp, Woodlake, Calif., assignor of one-half to Abe Dinkins, Woodlake, Calif.

Application January 15, 1934, Serial No. 706,646

1 Claim. (Cl. 265—27)

This invention relates to the fruit packing industry and particularly to the packing of fruit in lug boxes in the field.

Certain fruits, and particularly grapes, are placed in boxes for shipment directly as picked in the field, and each box is presumed to contain a certain weight of fruit, the sale price and other costs being based on such weight, which is standard. If the loaded boxes are overweight, no benefit accrues to the shipper from the excessive amount of fruit. If on the other hand the boxes are underweight the consignee is apt to complain and the shipper acquires a bad reputation. At the present time however the means for weighing the fruit in the field is very inconvenient to use, and adds to the cost of operations due to the additional handling of the loaded boxes being necessary. As a result the boxes are frequently shipped without being actually weighed and with an amount of fruit therein whose weight has been merely guessed at by the packer.

The principal object of my invention is to avoid the above objectionable and inaccurate methods by the provision of a combination packing stand-ard and weighing scales, so constructed that the boxes as they are being packed are supported in a convenient and conventional packing position; and as they are loaded the weight of the load as it accumulates is indicated in front of the packer to within reasonably accurate limits. The one handling of the box from its empty to a loaded and ready-to-ship condition is therefore all that is necessary when my improved device is employed.

A further object is to provide a device for the purpose so constructed that it is of a portable nature and while strong is so light that it may be easily moved about the field and used where closest to the fruit being picked.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views.

Figure 1:
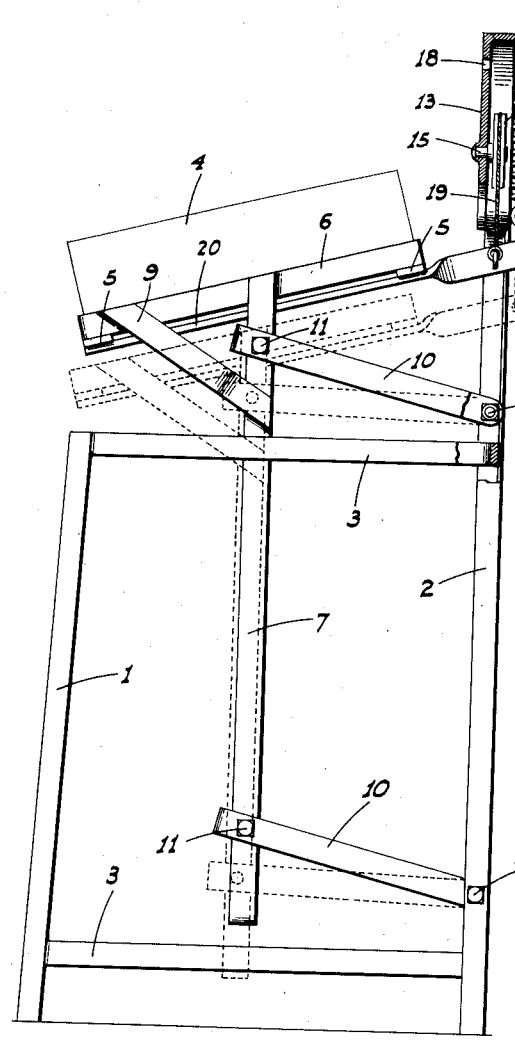
Figure 1 is a side elevation of the device partly broken away to show the scale structure.
Figure 2:
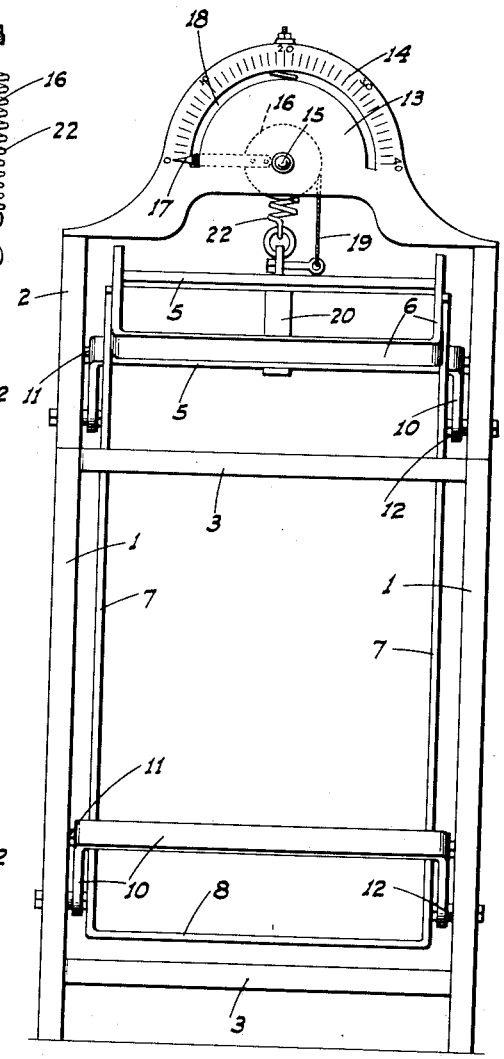
Figure 2 is a front elevation of the same.
Figure 3:
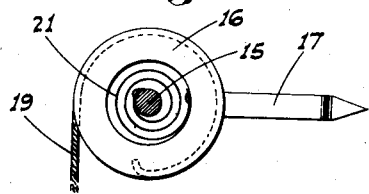
Figure 3 is a detached back view of the pulley and indicating pointer unit of the scales.

Referring now more particularly to the characters of reference on the drawing, the stand comprises pairs of front and rear legs 1 and 2 respectively rigidly connected together by upper and lower horizontal bands 3 so as to provide a rigid frame of rectangular form in plan, and of greater area than that of a standard fruit box. The back legs are somewhat taller than the front legs and support the weighing or scale structure as will be seen later.

Disposed above the level of the front of the frame is a supporting cradle for a standard lug box 4, the level of the cradle being such as to be convenient for packing operations. This cradle preferably comprises transversely extending bottom bars 5, spaced to support the box across its ends and an upstanding side and front flange unit 6 mounted on the bars to locate the box in place. The cradle also has an upward slope toward the rear so that the box is similarly disposed, which makes it convenient for packing purposes. The front flange element 6 therefore also prevents forward sliding of the box from the sloping cradle.

Rigidly secured to and depending inwardly of the stand from the side flanges 6 substantially central of their length are arms 7 connected at their lower ends by an integral cross bar 8. Diagonal strips 9 between the arms and the flange 6 brace said arms and add rigidity to the cradle so that the latter cannot move relative to said arms. Link yokes 10 extend in front of and beyond the arms to which they are pivoted as at 11, and then project back and on a slightly downward slope when the cradle and box are empty, to pivotal connections with the back legs 2 as at 12. The cradle is therefore floatably supported from the stand for direct vertical movement relative thereto.

Rigidly secured to and extending between the upper ends of the back legs is an upright plate 13 having a dial 14 graduated thereon in units of weight and concentric with and above the horizontal plane of a fixed pin 15 which is mounted in and projects back of the plate. Turnable on the pin behind the plate is a pulley or drum 16 to which is secured a radially extending indicating pointer 17. This pointer toward its outer end projects through a slot 18 in the plate 13 concentric with the pin and reads against the dial 14.

A light cable 19 wound about and secured to the drum depends from one side of the same and is connected to an arm 20. This arm is rigidly secured to and under the cradle bars 5 centrally of their ends and projects rearwardly thereof and under the plate 13. The cable is arranged so as to rotate the drum in that direction which will cause the pointer to denote an increase of weight with a lowering of the cradle. A suitable light spring is used to retract the drum and pointer, such as a spiral spring 21, one end of which is connected to the drum and the other end to the pin 15.

Also connected to the arm 20 back of the cable and drum is the man scales spring 22 of the tension type, which projects upwardly from said arm and has its other end secured in connection with the plate 13 at the top. This spring is designed so as to support the weight of the cradle and the empty box without deflection, or so that the pointer then reads against the zero mark on the dial.

It will thus be seen that as the box is loaded, the increase in weight as it occurs will be indicated on the dial behind and above the box and the packer will know the instant the box has the necessary and predetermined weight of fruit therein, without further time in handling the box being necessary. The structure is arranged so that the downward movement of the box as it is loaded is an appreciable amount, making it easier for the packer to lift the loaded box off the cradle.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A fruit-box packing and weighing stand comprising a floor supported frame which includes transversely spaced uprights and a top cross member, a box supporting cradle disposed in front of the uprights and having a downwardly slope toward the front from a level adjacent that of the cross member, arms depending from and rigidly secured to the cradle substantially midway between the front and back thereof, means connecting the arms and uprights to allow of direct vertical movement of the cradle; and spring means resisting downward movement of the cradle; there being a weight indicator mounted on and upstanding from the cross member and connected to the cradle and functioning with the downward movement of the cradle.

ADA R. UPP.